United States Patent
Yokoyama et al.

[11] Patent Number: 5,979,944
[45] Date of Patent: Nov. 9, 1999

[54] DEVICE FOR FIXING LOWER MEMBERS AND FLUID CONTROL APPARATUS INCORPORATING SAME

[75] Inventors: Kosuke Yokoyama; Tsutomu Shonohara; Shigeru Itoi; Michio Yamaji; Tetsuya Kojima, all of Osaka, Japan

[73] Assignee: Fujikin Incorporated, Osaka, Japan

[21] Appl. No.: 09/074,491

[22] Filed: May 8, 1998

[30] Foreign Application Priority Data

Sep. 24, 1997 [JP] Japan ..................................... 9-258075

[51] Int. Cl.⁶ ..................................................... F16L 39/00
[52] U.S. Cl. ........................ 285/124.3; 285/363; 285/906
[58] Field of Search .............................. 285/124.1, 124.2, 285/124.3, 124.4, 124.5, 25, 26, 28, 29, FOR 118, 363, 906

[56] References Cited

U.S. PATENT DOCUMENTS 5,255,647  10/1993  Kiczek .

FOREIGN PATENT DOCUMENTS

| 0 845 623 | 6/1998 | European Pat. Off. . |
| 9410561 | 9/1994 | Germany . |
| 295 11 400 | 9/1995 | Germany . |
| 2162921 | 2/1986 | United Kingdom . |

*Primary Examiner*—Dave W. Arola
*Attorney, Agent, or Firm*—Armstrong, Westerman, Hattori, McLeland & Naughton

[57] ABSTRACT

Lower members each have a bolt bore comprising a large-diameter portion larger than the head of a bolt in diameter, and a small diameter portion extending downward from the large-diameter portion with a stepped portion formed therebetween and having a diameter intermediate between the diameter of the bolt head and the diameter of the shank of the bolt. The small-diameter portion of the bolt bore has fitted therein a hollow cylindrical spacer with an inside diameter larger than the diameter of the bolt shank. The spacer has a lower end supported by a support member and an upper end positioned in the large-diameter portion. A hollow cylindrical elastic member is interposed between the bolt head and the stepped portion for biasing the lower member toward the support member.

3 Claims, 3 Drawing Sheets

DEVICE FOR FIXING LOWER MEMBERS AND FLUID CONTROL APPARATUS INCORPORATING SAME

BACKGROUND OF THE INVENTION

The present invention relates to a fixing device, for example, for use in fluid control apparatus which are assembled by fixing a plurality of couplings to a base plate and fixing on-off valves each to some of the couplings, the device being useful for fixing the couplings (lower member), to be disposed between the base plate (support member) and the on-off device (upper member), to the base plate (support plate).

The terms "upper" and "lower" as used herein refer respectively to the upper and lower sides of the drawings. However, these terms are used for the sake of convenience; the fixing device and the fluid control apparatus will be mounted on a horizontal surface, for example, in the illustrated state or as turned upside down, or may be attached to a vertical surface.

For example in fluid control apparatus for use in manufacturing semiconductors, etc., the lower members, i.e., coupling members having bolt bores, to be disposed between a support member and an upper member, i.e., an on-off valve, are fixed to the support member with bolts. To provide a fluid-tight joint between each lower member and the upper member in this case, a seal portion is formed between these members.

The conventional fluid control apparatus has the problem that when the lower members are fixed to the support member, the upper surfaces of the lower members are not always flush with each other, presenting difficulty in mounting the upper member on the lower members. If the upper member is mounted on the lower members with the upper surfaces of the lower members positioned at different levels, there arises the problem that different pressures acting on the seal portions produce a faulty seal.

SUMMARY OF THE INVENTION

An object of the present invention is to provide a fixing device for lower members which renders an upper member mountable on the lower members easily.

Another object of the invention is to provide a fluid control apparatus having incorporated therein a fixing device for lower members which renders an upper member mountable on the lower members easily, especially such a fluid control apparatus wherein seal portions provided between the lower members and the upper member are subjected to a uniform pressure.

The present invention provides a device for fixing lower members to a support member with bolts, the lower members each having a bolt bore and being disposed between the support member and an upper member, the fixing device being characterized in that the bolt bore of each of the lower members comprises a large-diameter portion larger than a head of the bolt in diameter, and a small diameter portion extending downward from the large-diameter portion with a stepped portion formed therebetween and having a diameter intermediate between the diameter of the bolt head and the diameter of a shank of the bolt, the small-diameter portion of the bolt bore having fitted therein a hollow cylindrical spacer with an inside diameter larger than the diameter of the bolt shank, the spacer having a lower end supported by the support member and an upper end positioned in the large-diameter portion, a hollow cylindrical elastic member being interposed between the bolt head and the stepped portion for biasing the lower member toward the support member.

The elastic member, which is preferably a rubber washer, may alternatively be a coiled compression spring equivalent to the rubber washer in modulus of elasticity.

When the bolts are tightened in fixing the lower member to the support member, each spacer is held between the bolt head and the support member, preventing further tightening of the bolt. At this time, the elastic member biases the lower member toward the support member, restraining the lower member from backlashing. On the other hand, the compression of the elastic members moves one of the lower members whose upper surface is at a lower level in a direction away from the support member, whereby the upper surfaces of the lower members are made flush with each other. This renders the upper member easily mountable on the lower members.

The fixing device is used, for example, in a fluid control apparatus. In this case, the lower members are couplings each having a fluid channel opened upward, and the upper member is an on-off valve formed with two fluid channels opened downward and communicating with the respective fluid channels of the lower members. A flow channel is then available which extends from one of the couplings to the other couplings through the on-off valve. Such couplings, on-off valves and other fluid controllers are used in combination to provide a desired fluid control apparatus.

In such a fluid control apparatus, it is desired that a seal portion be provided between butting faces of each lower member and the upper member around the communicating fluid channels thereof. A fluid-tight joint is then formed between the upper member and the lower members by virtue of the provision of the seal portions, while the lower members have their upper surfaces positioned flush with each other. Consequently, the seal portions can be subjected to a uniform pressure.

DESCRIPTION OF THE PREFERRED EMBODIMENT

An embodiment of the present invention will be described below with reference to the drawings. In the following description, the terms "left" and "right" refer respectively to the left- and right-hand sides of FIG. 1.

Figure 1:
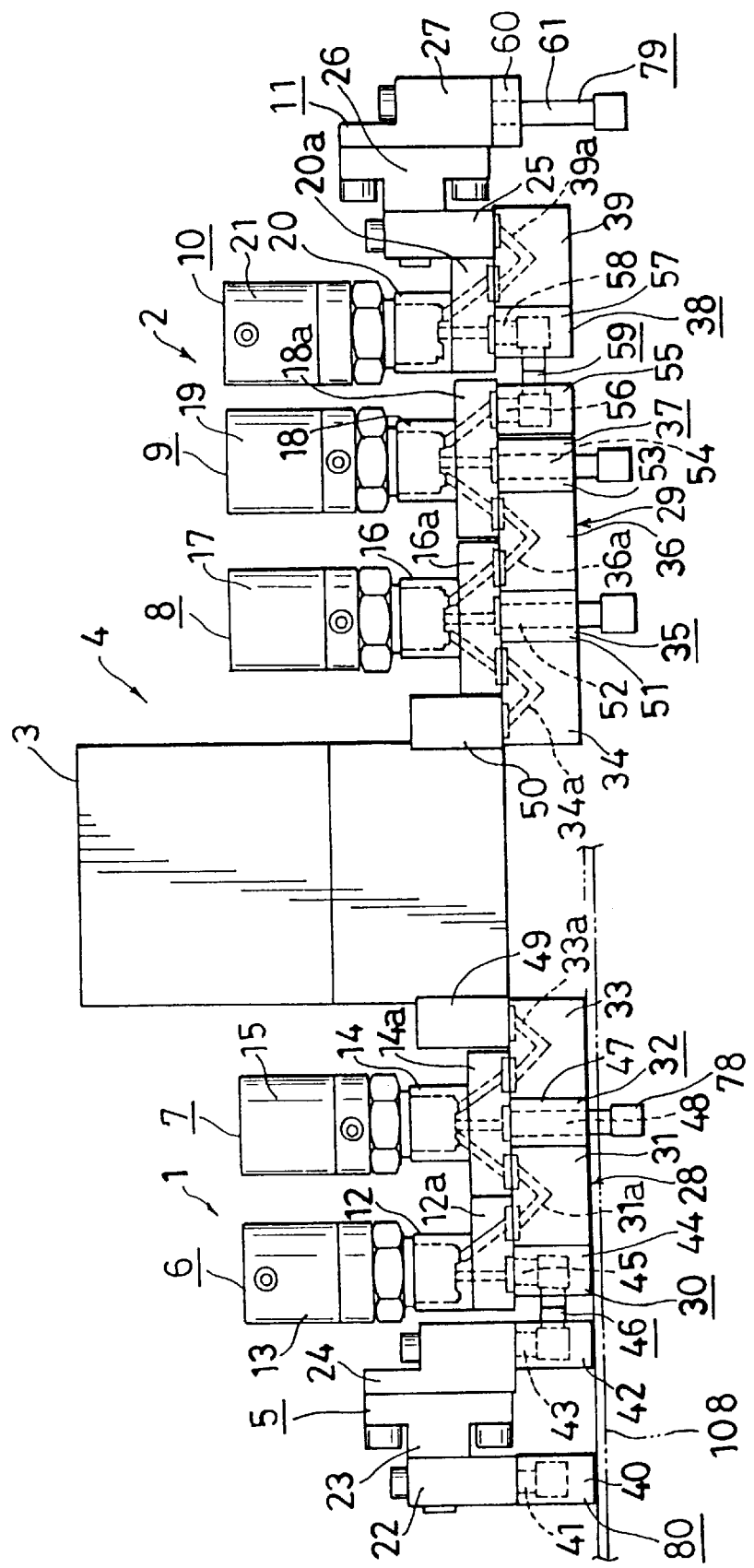
FIG. 1 is a front view showing an example of fluid control apparatus wherein lower member fixing devices of the invention are used.
Figure 2:
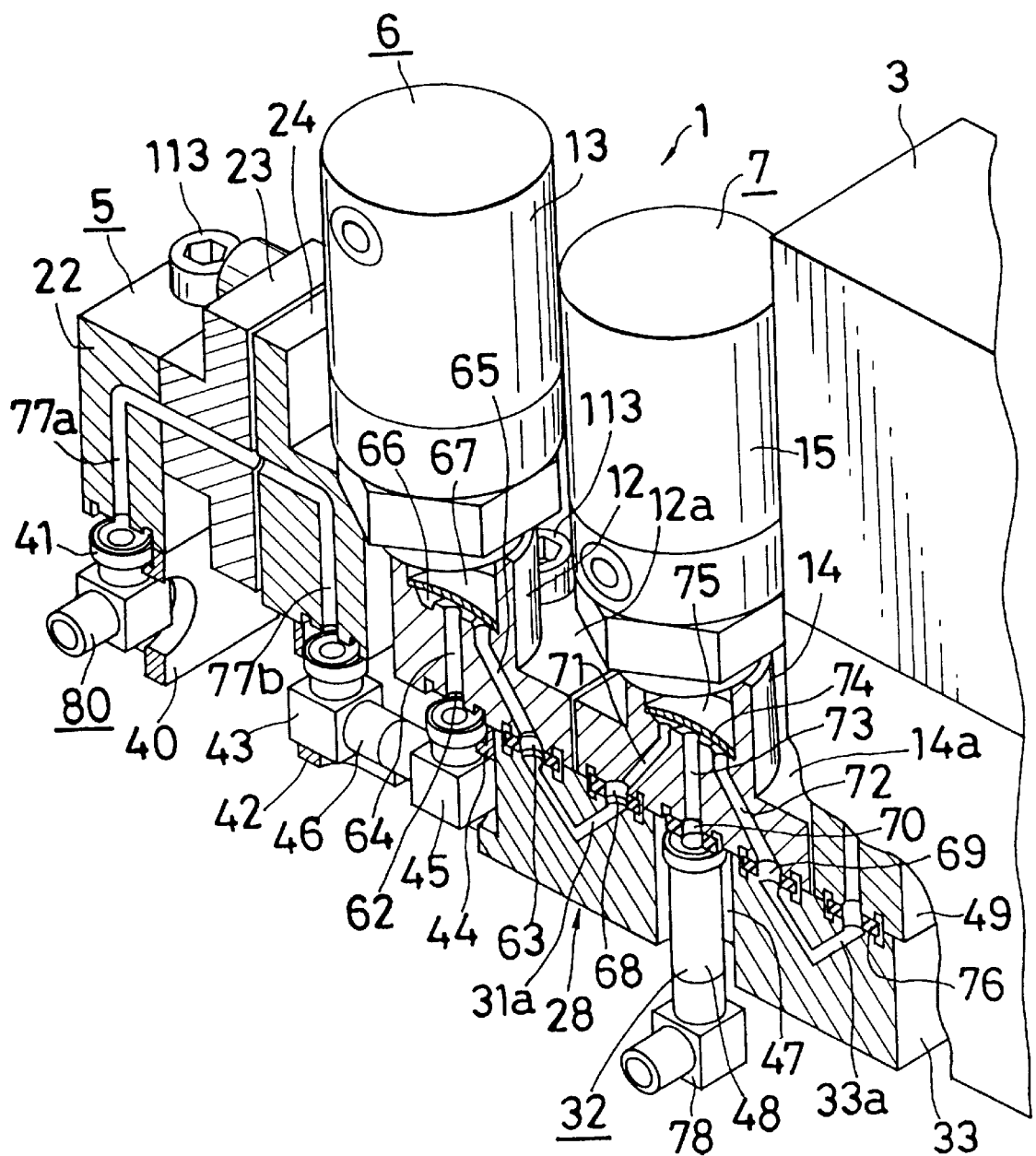
FIG. 2 is an exploded fragmentary perspective view partly broken away and showing the apparatus of FIG. 1 on an enlarged scale.

FIGS. 1 and 2 show an example of fluid control apparatus having incorporated therein the device of the invention for fixing a lower member. The fluid control apparatus 4 is adapted for use in semiconductor manufacturing equipment or the like and comprises a massflow controller 3, and shutoff-opening devices 1, 2 at the left and right of the controller 3.

The shutoff-opening device 1 at left comprises a first on-off valve 6 at left, a second on-off valve 7 at right and a first valve mount 28 having the two valves 6, 7 mounted thereon. The first valve mount 28 comprises a plurality of couplings 80, 30, 31, 32, 33 as will be described later. Disposed at the left of the left shutoff-opening device 1 is a first check valve 5.

The shutoff-opening device 2 at right comprises a third on-off valve 8 disposed at left, a fourth on-off valve 9 disposed at an intermediate position, a fifth on-off valve 10 disposed at right and a second valve mount 29 having these valve 8, 9, 10 mounted thereon. The second valve mount 29 comprises a plurality of couplings 34, 35, 36, 37, 38, 39, 79 as will be described later. Disposed at the right of the right shutoff-opening device 2 is a second check valve 11.

The on-off valves 6, 7, 8, 9, 10 comprise respective main bodies 12, 14, 16, 18, 20 and respective actuators 13, 15, 17, 19, 21 mounted thereon from above for suitably opening and closing a channel through each valve main body. The first and fifth on-off valves 6, 10 are two-port valves, while the second, third and fourth on-off valves 7, 8, 9 are three-port valves. The main bodies 12, 14, 16, 18, 20 of the on-off valves 6 to 10 are provided at their lower ends with flanges 12a, 14a, 16a, 18a, 20a, respectively, which are rectangular when seen from above.

Each of the check valves 5, 11 comprises a left main body 22 (25) having an inlet in its bottom face, a middle main body 23 (26) screwed to the main body 22 (25) and a right main body 24 (27) having an outlet in its bottom face and fastened with screws to the middle main body 23 (26).

The massflow controller 3 is formed on the left side of its lower end with a rectangular parallelepipedal leftward extension 49 having an inlet in its bottom face, and on the right side of its lower end with a rectangular parallelepipedal rightward extension 50 having an outlet in its bottom face.

The bottom faces of the valve main bodies 22, 23, 24, 12, 14 at the left of the massflow controller 3 and the bottom face of the leftward extension 49 of the controller 3 are all flush with one another. The rightward extension 50 of the controller 3 and the valve main bodies 16, 18, 20, 25, 26, 27 have their bottom faces positioned all flush with one another.

The inlet of left main body 22 of the first check valve 5 is provided with a purge gas supply coupling 80 connected to a purge gas supply line and comprising a holding member 40 and an L-shaped channel member 41 held by the member 40.

The outlet of right main body 24 of the first check valve 5 is held in communication with an inlet of main body 12 of the first on-off valve 6 by a first inflow channel coupling 30 for introducing a fluid into the left shutoff-opening device 1. The coupling 30 comprises two holding members 42, 44 and a U-shaped communication channel member 46 held by these members 42, 44 and comprising two L-shaped channel members 43, 45 which are joined to each other.

Opposed to both the bottom face of rightward portion of main body 12 of the first on-off valve 6 and the bottom face of leftward portion of main body 14 of the second on-off valve 7 is a coupling 31 in the form of a rectangular parallelepipedal block for forming a first communication channel and having a V-shaped channel 31a for causing an outlet of the valve 6 to communicate with an inlet of the valve 7.

The main body 14 of the second on-off valve 7 has an inlet-outlet subopening, which is provided with a first subchannel coupling 32 comprising a holding member 47 and an I-shaped channel member 48 and held by the member 47. Attached to the lower end of the coupling 32 is a known L-shaped coupling 78 connected to a process gas supply line.

Disposed beneath both the rightward portion of main body 14 of the valve 7 and the leftward extension 49 of the massflow controller 3 is a coupling 33 in the form of a rectangular parallelepipedal block for forming a first outflow channel and having a V-shaped channel 33a for sending a fluid from the outlet of the valve 7 to the controller 3.

Disposed beneath both the bottom face of rightward extension 50 of the massflow controller 3 and the bottom face of leftward portion of main body 16 of the third on-off valve 8 is a coupling 34 in the form of a rectangular parallelepipedal block for forming a second inflow channel and having a V-shaped channel 34a for introducing a fluid from the controller 3 into the right shutoff-opening device 2.

The main body 16 of the third on-off valve 8 has an inlet-outlet subopening, which is provided with a second subchannel coupling 35 connected to an evacuating line and comprising a holding member 51 and an L-shaped channel member 52 and held by the member 51.

Disposed beneath both the bottom face of rightward portion of main body 16 of the third on-off valve 8 and the bottom face of leftward portion of main body 18 of the fourth on-off valve 9 is a coupling 36 in the form of a rectangular parallelepipedal block for forming a second communication channel and having a V-shaped channel 36a for causing an outlet of the valve 8 to communicate with an inlet of the valve 9.

The main body 18 of the fourth on-off valve 9 has an inlet-outlet subopening, which is provided with a third subchannel coupling 37 connected to a process gas supply line and comprising a holding member 53 and an L-shaped channel member 54 and held by the member 53.

An outlet of main body 18 of the fourth on-off valve 9 is held in communication with an inlet of main body 20 of the fifth on-off valve 10 by a third communication channel coupling 38, which comprises two holding members 55, 57 and a communication channel member 59 held by these members. The member 59 comprises two L-shaped channel members 56, 58 joined to each other.

Disposed beneath both the bottom face of rightward portion of main body 20 of the fifth on-off valve 10 and the bottom face of left main body 25 of the second check valve 11 is a coupling 39 in the form of a rectangular parallelepipedal block for forming a second outflow channel and having a V-shaped channel 39a for causing an outlet of the valve 10 to communicate with the inlet of the valve 11.

The outlet of right main body 27 of the second check valve 11 is provided with a purge gas discharge coupling 79 connected to a purge gas discharge line and comprising a holding member 60 and an L-shaped channel member 61 held by the member 60.

The first inflow channel coupling 30, first communication channel coupling 31, first subchannel coupling 32 and first outflow channel coupling 33 which are positioned at the left side of the controller 3 form the valve mount 28 of the left shutoff-opening device 1. The second inflow channel coupling 34, second subchannel coupling 35, second communication channel coupling 36, third subchannel coupling 37, third communication channel coupling 38 and second outflow channel coupling 39 which are positioned at the right side of the controller 3 provide the valve mount 29 of the right shutoff-opening device 2.

Thus, the left shutoff-opening device 1 has a purge gas channel through which a purge gas admitted through the check valve 5 is discharged via the first inflow channel coupling 30, the main body 12 of the first on-off valve 6, the first communication channel coupling 31, the main body 14 of the second on-off valve 7 and the first outflow channel coupling 33, and a process gas channel through which a process gas admitted from the bottom face of the first subchannel coupling 32 is discharged via the coupling 32, the main body 14 of the second on-off valve 7 and the first outflow channel coupling 33. The right shutoff-opening device 2 has a purge gas channel through which the purge gas introduced via the controller 3 is discharged by way of the second inflow channel coupling 34, second communication channel coupling 36, third communication channel coupling 38 and second outflow channel coupling 39; a process gas channel through which the process gas admitted through the controller 3 is fed to a process chamber via the second inflow channel coupling 34, second communication channel coupling 36 and third subchannel coupling 37; and an evacuating channel for drawing off the gas from these channels via the second subchannel coupling 35.

As shown on an enlarged scale in FIG. 2, the first check valve 5 has an inflow channel 77a and an outflow channel 77b which are opened downward. The main body 12 of the first on-off valve 6 is formed in its bottom face with an inlet 62 positioned approximately centrally thereof, and an outlet 63 positioned at right. The valve main body 12 is internally formed with an inflow channel 64 extending from the inlet 62 to a valve chamber 66, and an outflow channel 65 extending from the outlet 63 to the chamber 66. The actuator 13 of the first on-off valve 6 serves to operate a valve element 67 in the form of a diaphragm. When operated, the actuator 13 opens or closes the inflow channel 64 with the valve element 67. The main body 14 of the second on-off valve 7 is formed in its bottom face with an inlet 68 at left, an outlet 69 at right and an inlet-outlet subopening 70 positioned approximately in the center to serve as an inlet or outlet for other fluid. The valve main body 14 is internally formed with an inflow channel 71 extending from the inlet 68 to a valve chamber 74, a subchannel 73 extending from the subopening 70 to the chamber 74 and an outflow channel 72 extending from the outlet 69 to the chamber 74. The actuator 15 of the second on-off valve 7 serves to operate a valve element 75 in the form of a diaphragm. When operated, the actuator 15 opens or closes the subchannel 73 with the valve element 75. On the other hand, the inflow channel 71 extending to the inlet 68 of the second on-off valve 7 is always in communication with the outflow channel 72 extending to the outlet 69 through the valve chamber 74.

A seal 76 as shown in FIG. 2 is provided between each of the valve main bodies 22, 23, 24, 12, 14, 16, 18, 20, 25, 26, 27 and at least one of the members 41, 30, 31, 32, 33, 34, 35, 36, 37, 38, 39, 61 joined to the valve main body in butting contact. The check valves 5, 11 and the on-off valves 6, 7, 8, 9, 10 are each fastened to at least one of the couplings 80, 30, 31, 32, 33, 34, 35, 36, 37, 38, 39, 79 opposed thereto with bolts 113 screwed into the main body 22, 23, 24, 12, 14, 16, 18, 20, 25, 26 or 27 from above (see FIG. 2). The check valves 5, 11 and the on-off valves 6 to 10 can be removed upward by removing these bolts 113. In construction, the second check valve 11 is identical with the first check valve 5, the fifth on-off valve 10 with the first on-off valve 6, and the third and fourth on-off valves 8, 9 with the second on-off valve 7.

With the fluid control apparatus 4 having the foregoing construction, the process gas is admitted into the first subchannel coupling 32 of the left shutoff-opening device 1, with the first on-off valve 6 closed, the second on-off valve 7 held open, the third on-off valve 8 closed, the fourth on-off valve 9 held open and the fifth on-off valve 10 closed, whereupon the process gas flows through the main body 14 of the second on-off valve 7 and the first outflow channel coupling 33 into the massflow controller 3, wherein the gas has its flow rate regulated. The gas is then admitted into the right shutoff-opening device 2, thereafter flows through the second inflow channel coupling 34, the main body 16 of the third on-off valve 8, the second communication channel coupling 36, the main body 18 of the fourth on-off valve 9 and the third subchannel coupling 37 and is sent into the process chamber. When the purge gas is thereafter admitted into the first check valve 5, with the first on-off valve 6 held open, the second on-off valve 7 closed, the third on-off valve 8 closed, the fourth on-off valve 9 closed and the fifth on-off valve 10 held open, the purge gas flows through the first inflow channel coupling 30, the main body 12 of the first on-off valve 6, the first communication channel coupling 31, the main body 14 of the second on-off valve 7 and the first outflow channel coupling 33, reaches the massflow controller 3, further flows through the second inflow channel coupling 34, the main body 16 of the third on-off valve 8, the second communication channel coupling 36, the main body 18 of the fourth on-off valve 9, the third communication channel coupling 38, the main body 20 of the fifth on-off valve 10, second outflow channel coupling 39 and the second check valve 11, and is discharged. At this time, the purge gas drives out with its own pressure the process gas remaining in the main body 14 of the second on-off valve 7, first outflow channel coupling 33, second inflow channel coupling 34 and second communication channel coupling 36, with the result that purge gas only flows through the apparatus in a short period of time.

With the shutoff-opening devices 1, 2, the first inflow channel coupling 30 and the third communication channel coupling 38 are common members, the first communication channel coupling 31, first outflow channel coupling 33, second inflow channel coupling 34, second communication channel coupling 36 and second outflow channel coupling 39 are common members, and subchannel couplings 32, 35, 37 are also common members. In other words, the right shutoff-opening device 2 is available only by adding one three-port on-off valve to the left shutoff-opening device 1 and adding to the valve mount 28 thereof the same members as the first communication channel coupling 31 and the first subchannel coupling 32. When the on-off valve to be added is a two-port valve, the fourth on-off valve 9 of the right shutoff-opening device 2 is replaced by a two-port valve, with the third subchannel coupling 37 removed from the mount 29. Thus, the left and right shutoff-opening devices 1 and 2 are amenable to various modifications.

With the embodiment shown in FIG. 1, the left shutoff-opening device 1 has two on-off valves 6, 7, while the right shutoff-opening device 2 has three on-off valves 8, 9, 10, whereas the number of on-off valves is variable suitably. Two shutoff-opening devices each having a suitable number of on-off valves are arranged respectively at the left and right sides of a massflow controller, and such arrangements are further arranged in parallel to provide a fluid control apparatus for use in semiconductor manufacturing equipment. The fluid control apparatus is installed by mounting the couplings 80, 30, 31, 32, 33, 34, 35, 36, 37, 38, 39 on a base plate 108 with bolts, attaching the fluid controllers, such as check valves 5, 11, on-off valves 6, 7, 8, 9, 10 and massflow controller 3, to the couplings 80, 30 to 39 as specified and fixing the base plate 108 in position.

Next with reference to FIG. 3, a description will be given of a fixing device of the invention for lower members, i.e., a device for fixing coupling members (lower members) to a base plate with bolts, the coupling members being disposed between the base plate (support member) and fluid controllers (upper members).

Figure 3:
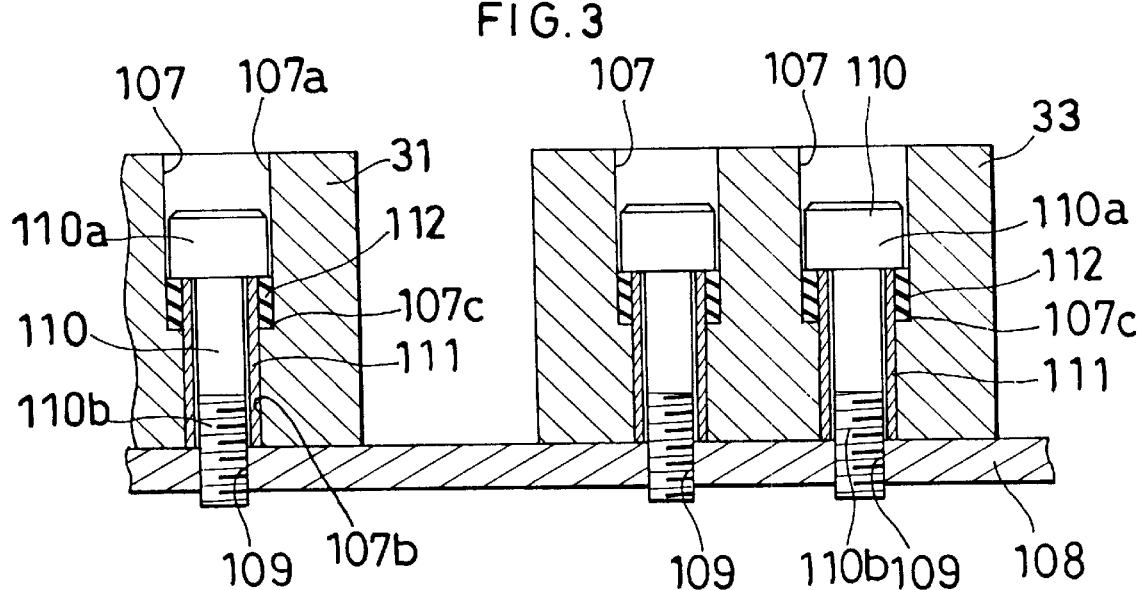
FIG. 3 is a sectional view showing the lower member fixing device of the invention.

Referring to FIG. 3, two block couplings 31 for attaching the on-off valves 6, 7 thereto are mounted on the base plate 108. A screw bore 106 for use in attaching the block coupling 31 to the on-off valve main body is formed in the upper side of the coupling 31 at each of four corners thereof. A bolt bore 107 for inserting a coupling fixing bolt 110 therethrough for mounting the block coupling 31 on the base plate 108 is formed at each of two portions of the coupling 31 close to its central portion. The base plate 108 is formed with screw bores 109 for use in mounting the block coupling 31 on the base plate 108.

The bolt bore 107 of the block coupling 31 is formed by a large-diameter portion 107a having a diameter larger than the diameter of the head 110a of the coupling fixing bolt 110, and a small-diameter portion 107b continuous with the portion 107a, with a stepped portion 107c provided therebetween, and having a diameter intermediate between the diameter of the bolt head 110a and the diameter of the shank 10b of the bolt.

A sleevelike spacer 111 having a lower end bearing on the base plate 108 and an upper end positioned in the large-diameter portion 107a is fitted in the small diameter portion 107a of the bolt bore 107. The spacer 111 has an inside diameter larger than the diameter of the bolt shank 10b and an outside diameter smaller than the diameter of the bolt head 110a. The shank 110b of the coupling fixing bolt 110 is fitted in the spacer 111, with the bolt head 110a bearing on the upper end face of the spacer 111. The spacer 11 serves to determine the amount of tightening of the coupling fixing bolt 110, such that as the bolt 110 inserted through the bore 107 is screwed into the screw bore 109 of the base plate 108, the head 110a of the bolt 110 is supported by the spacer 111 bearing on the base plate 108, preventing further tightening of the bolt.

An annular rubber washer 112 having an outside diameter approximately equal to the diameter of the head 110a of the coupling fixing bolt 110 is fitted around the upper end of the spacer 111. The rubber washer 112 is held between the head 110a of the bolt 110 and the stepped portion 107c of the bolt bore 107. The vertical length of the rubber washer 112 is so determined that a compressive force will act on the washer when the bolt 110 is completely tightened up in the state shown in FIG. 3. Thus, the couplings 31 are biased toward the base plate 108 by the rubber washers 112. The rubber washers 112, which are elastic, can be further deformed by compression, so that the couplings 31 are movable away from the base plate 108. Accordingly, even if the upper surfaces of the couplings 31 are not flush with each other, the couplings 31 are brought closer to the on-off valve 7 as the on-off valve 7 is fastened to the couplings 31 with the body fixing bolts 113, which can therefore be tightened easily. Consequently, all the seals 76 can be subjected to a proper pressure to ensure fluid tightness.

Figure 4:
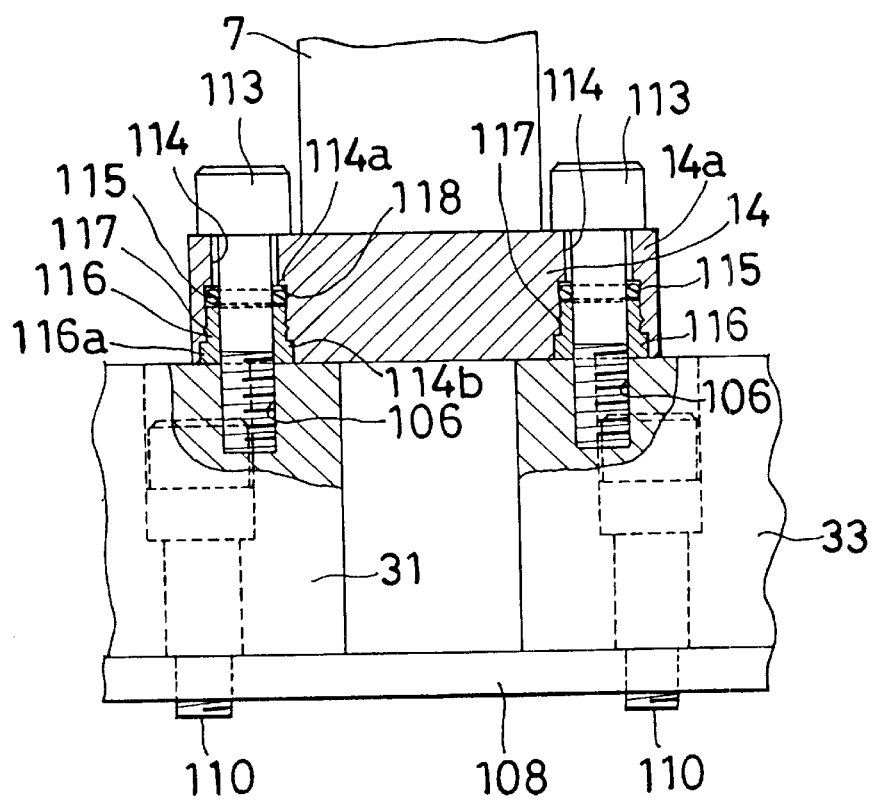
FIG. 4 is a sectional view showing a device for preventing a bolt from slipping off.

FIG. 4 shows a device for preventing the body fixing bolt 113 from slipping off for use in attaching the on-off valve 7 to two block couplings 31, 33.

With reference to the drawing, bolt shank bores 114 are formed in the flange 14a of the main body 14 of the on-off valve 7. Each of the shank bores 114 has stepped portions 114a and 114b respectively at an intermediate part of the bore and a part thereof close to the bore lower end to give the largest diameter to the lower end of the bore 114. An O-ring 115 is fitted in the shank bore 114 from its lower end in bearing contact with the intermediate stepped portion 114a. A bush 116 is further fitted in the bore 114 from the larger diameter side for preventing the O-ring 115 from slipping out. Thus, an annular recess 118 for accommodating the O-ring is defined by the intermediate stepped portion 114a, the upper end face of the bush 116 and the periphery of the bored portion 114 for the bolt shank. The bush 116 is formed at its lower end with a flange 116a in bearing contact with the stepped portion 114b close to the bore lower end. The bush 116 further has at an intermediate portion thereof an annular ridge 117 with an outside diameter slightly larger than the diameter of the shank bore portion having this intermediate portion fitted in. When the bush 116 is forced into the shank bore 114 from its larger diameter side, the flange 116a bears against the stepped portion 114b close to the bore lower end, and the annular ridge 117 is collapsed, whereby the bush 116 is prevented from slipping out, consequently preventing the O-ring 115 from slipping off. The O-ring 115 has an inside diameter slightly smaller than the outside diameter of the shank of the body fixing bolt 113. Since the O-ring is elastic, the shank of the bolt 113 can be forcibly inserted through the O-ring 115 with extreme ease. When the fixing bolt 113 is unfastened and becomes disengaged from the screw bore 106, the elastic force of the O-ring 115 retains the bolt 113 on the ring 115. Accordingly, even in the case where the base plate 108 is installed in a vertical position (as turned from the illustrated horizontal position thereof), this feature obviates the likelihood that the body fixing bolt 113 to be screwed in or removed will fall off to become lost.

What is claimed is:

1. A device for fixing lower members to a support member with bolts, said device comprising:

a plurality of lower members each having a bolt bore and being disposed between the support member and an upper member, at least one of said bolt bores includes a large-diameter portion larger than a head of the bolt in diameter, and a small diameter portion extending downward from the large-diameter portion with a stepped portion formed therebetween and having a diameter intermediate between the diameter of the bolt head and the diameter of a shank of the bolt, the small diameter portion of the bolt bore having fitted therein a hollow cylindrical spacer with an inside diameter larger than the diameter of the bolt shank, the spacer having a lower end supported by the support member and an upper end positioned in the large-diameter portion, a hollow cylindrical elastic member being interposed between the bolt head and the stepped portion for biasing the lower member toward the support member in response to advancement of the bolt into said support member, and said support member includes at least one screw bore which receives a bolt shank inserted through said at least one of said bolt bores.

2. A fluid control apparatus comprising a device for fixing lower members according to claim 1 and an upper member, each of the lower members having a fluid channel opened upward, the upper member being formed with two fluid channels opened downward and communicating with the respective fluid channels of the lower members.

3. A fluid control apparatus according to claim 2 wherein a seal portion is provided between butting faces of each lower member and the upper member around the communicating fluid channels thereof.

* * * * *